(12) United States Patent
Simanovsky et al.

(10) Patent No.: US 6,195,444 B1
(45) Date of Patent: Feb. 27, 2001

(54) APPARATUS AND METHOD FOR DETECTING CONCEALED OBJECTS IN COMPUTED TOMOGRAPHY DATA

(75) Inventors: Sergey Simanovsky, Lynn; Ibrahim M. Bechwati, Roslindale; Muzzafer Hiraoglu, Woburn; Carl R. Crawford, Brookline, all of MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 09/228,380

(22) Filed: Jan. 12, 1999

(51) Int. Cl.$^7$ ........................................ G06K 9/00
(52) U.S. Cl. ........................ 382/100; 382/173; 382/131
(58) Field of Search ............................. 382/100, 131, 382/154, 173, 256, 270; 378/4, 8, 20, 54, 57, 62, 901

(56) References Cited

U.S. PATENT DOCUMENTS

| | | | |
|---|---|---|---|
| 4,856,528 | * 8/1989 | Yang et al. | 128/653 |
| 4,903,202 | * 2/1990 | Crawford | 364/413.13 |
| 4,905,148 | * 2/1990 | Crawford | 364/413.1 |
| 5,182,764 | * 1/1993 | Peschmann et al. | 378/57 |
| 5,185,809 | * 2/1993 | Kennedy et al. | 382/6 |
| 5,319,551 | * 6/1994 | Sekiguchi et al. | 364/413.19 |
| 5,367,552 | * 11/1994 | Peschmann | 378/57 |
| 5,712,926 | 1/1998 | Eberhard et al. | 382/205 |
| 5,802,134 | * 9/1998 | Larson et al. | 378/4 |
| 5,859,891 | * 1/1999 | Hibbard | 378/62 |
| 5,881,122 | * 3/1999 | Crawford et al. | 378/4 |
| 5,881,124 | * 3/1999 | Giger et al. | 378/8 |
| 5,887,047 | * 3/1999 | Bailey et al. | 378/4 |
| 5,901,198 | * 5/1999 | Crawford et al. | 378/57 |
| 5,905,806 | * 5/1999 | Eberhard et al. | 382/100 |
| 5,909,477 | * 7/1999 | Crawford et al. | 378/4 |
| 5,932,874 | * 8/1999 | Legg et al. | 250/231.13 |
| 5,937,028 | * 8/1999 | Tybinkowski et al. | 378/203 |
| 5,949,842 | * 9/1999 | Schafer et al. | 378/4 |
| 5,970,113 | * 10/1999 | Crawford et al. | 378/19 |
| 5,982,843 | * 11/1999 | Bailey et al. | 378/4 |
| 5,982,844 | * 11/1999 | Tybinkowski et al. | 378/4 |
| 6,018,562 | * 1/2000 | Willson | 378/9 |
| 6,026,143 | * 2/2000 | Simanovsky et al. | 378/57 |
| 6,026,171 | * 2/2000 | Hirauglu et al. | 382/100 |
| 6,035,014 | * 3/2000 | Hiraoglu et al. | 378/57 |

\* cited by examiner

*Primary Examiner*—Andrew W. Johns
(74) *Attorney, Agent, or Firm*—McDermott, Will & Emery

(57) ABSTRACT

A method and apparatus for detecting concealed objects in computed tomography data are disclosed. Sheet-shaped objects such as sheet explosives can be detected by a CT scanning system, in particular, a CT baggage scanning system. The invention analyzes CT voxels in a subregion in proximity to the sheet object to determine if the sheet object is concealed in an electronic device or is "sandwiched" within an item such as a book or magazine. To detect electronic concealment, the number of voxels in a subregion that contains the object having a density above a predetermined threshold is counted and the ratio of that number of voxels to the number of object voxels is computed. If the ratio exceeds a threshold, then it is concluded that the object is concealed in electronics. In response, the CT scanning system can alter discrimination parameters to allow the object to be classified as a threat. For "sandwich" concealment, layers on opposite sides of a sheet object are examined. The mean and standard deviation of density values for the voxels are computed. Where the mean density exceeds a predetermined threshold and the standard deviation is below a different threshold, for at least one of the layers, then it is concluded that the sheet object is sandwiched within an innocuous object such as a magazine or a book.

54 Claims, 9 Drawing Sheets

APPARATUS AND METHOD FOR DETECTING CONCEALED OBJECTS IN COMPUTED TOMOGRAPHY DATA

RELATED APPLICATIONS

This application is related to the following copending U.S. applications, of the same assignee as the present application, the contents of which are incorporated herein in their entirety by reference.

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982;844

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198;

"Parallel Processing Architecture for Computed Tomography Scanning System Using Non-Parallel Slices," invented by Christopher C. Ruth, et al., U.S. application Ser. No. 08/948,697, filed on Oct. 10, 1997, now U.S. Pat. No. 5,887,047;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122;

"Computed Tomography Scanning Apparatus and Method Using Adaptive Reconstruction Window," invented by Bernard M. Gordon, et al., U.S. application Ser. No. 08/949,127, filed on Oct. 10, 1997.

"Area Detector Array for Computed Tomography Scanning System," invented by David, A. Schafer, et al., U.S. application Ser. No. 08/948,450, filed on Oct. 10, 1997, now U.S. Pat. No. 6,091,795;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,026,143;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171;

"Apparatus and Method for Optimizing Detection of Objects in Computed Tomography Data," invented by Muzaffer Hiraoglu, et al., U.S. application Ser. No. 09/022, 062, filed on Feb. 11, 1998;

"Multiple-Stage Apparatus and Method for Detecting Objects in Computed Tomography Data," invented by Muzaffer Hiraoglu, et al., U.S. application Ser. No. 09/022, 164, filed on Feb. 11, 1998, now U.S. Pat. No. 6,035,014;

"Computed Tomography Apparatus and Method for Classifying Objects," invented by Sergey Simanovsky, et al., U.S. application Ser. No. 09/022,059, filed on Feb. 11, 1998;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998; and "Apparatus and Method for Processing Objects in Computed Tomography Data Using Object Projections," invented by Carl R. Crawford, et al., U.S. application Ser. No. 09/228,379 filed on even date herewith.

FIELD OF THE INVENTION

The present invention relates generally to computed tomography (CT) scanners and more specifically to a target detection apparatus and method in a baggage scanning system which utilizes CT technology.

BACKGROUND OF THE INVENTION

Various X-ray baggage scanning systems are known for detecting the presence of explosives and other prohibited items in baggage or luggage prior to loading the baggage onto a commercial aircraft. Since many explosive materials may be characterized by a range of densities differentiable from that of other items typically found in baggage, explosives are generally amenable to detection by X-ray equipment. A common technique for measuring a material's density is to expose the material to X-rays and to measure the amount of radiation absorbed by the material, the absorption being indicative of the density.

A system using CT technology typically includes a CT scanner of the third generation type, which typically includes an X-ray source and an X-ray detector system secured to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include an array of detectors disposed as one or more rows in the shape of a circular arc having a center of curvature at the focal spot of the X-ray source, i.e., the point within the X-ray source from which the X-rays emanate. The X-ray source generates a fan-shaped beam, or fan beam, or cone beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is relatively thin in that direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors of the array for any measuring interval is referred to as a "projection," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from a point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms, a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner.

Certain types of explosives present a particular challenge to baggage scanning systems because, due to their moldable nature, they may be formed into geometric shapes that are difficult to detect. Many explosives capable of significantly damaging an aircraft are sufficiently large in length, width, and height so as to be readily detectable by an X-ray scanner system regardless of the explosive's orientation within the baggage. However, an explosive powerful enough to damage an aircraft can also be formed into a relatively thin sheet that is extremely small in one dimension and is relatively large in the other two dimensions. These thin sheet explosives can be hidden inside an object such as a piece of electronic equipment, e.g., a lap top computer or can be sandwiched inside an innocuous item such as a magazine or book. The detection of such concealed explosives may be difficult because it may be difficult to see the explosive material in the image.

Baggage scanners using CT techniques have been proposed. One approach, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "InVision Machine." The InVision Machine includes a CT scanner of the third generation type, which typically include an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

One important design criterion for a baggage scanner is the speed with which the scanner can scan an item of baggage. To be of practical utility in any major airport, a baggage scanner should be capable of scanning a large number of bags at a very fast rate. One problem with the InVision Machine is that CT scanners of the type described in the '764 and '552 patents take a relatively long time, e.g., from about 0.6 to about 2.0 seconds, for one revolution of the disk to generate the data for a single sliced CT image. Further, the thinner the slice of the beam through the bag for each image, the better the resolution of the image. The CT scanner should provide images of sufficient resolution to detect plastic explosives on the order of only a few millimeters thick. Therefore, to provide adequate resolution, many revolutions are required. To meet high baggage throughput rates, a conventional CT baggage scanner such as the InVision Machine can only afford to generate a few CT images per bag. Clearly, one cannot scan the entire bag within the time allotted for a reasonably fast throughput. Generating only a few CT images per baggage items leaves most of the item unscanned and therefore does not provide scanning adequate to identify all potential threat objects in the bag, such as sheets of explosive material.

To improve throughput, the InVision Machine uses a pre-screening process which produces a two-dimensional projection image of the entire bag from a single angle.

Regions of the projection identified as potentially containing threat items can then be subjected to a full scan or manual inspection. With this pre-screening and selective region scanning approach, the entire bag is not scanned, thus allowing potential threat items to pass through undetected. This is especially true in the case of sheet items oriented transversely to the direction of propagation of the radiation used to form the pre-screen projection and where the sheet covers a relatively large portion of the area of the bag.

Another baggage scanning system is described in U.S. Pat. No. 5,712,926, issued on Jan. 27, 1998 entitled, "X-Ray Computed Tomography (CT) System for Detecting Thin Objects," invented by Eberhard, et al. (referred to herein as the "Eberhard et al. system"). In the Eberhard, et al. system, an entire bag is subjected to a CT scan to generate voxel density data for the bag. A connected components labeling (CCL) process is then applied to the entire bag to identify objects by grouping voxels which are physically close together and which have densities within a predetermined range of densities. In this and other systems, the voxels in each object are then counted to determine the volume of each object. If the volume of an object exceeds a threshold, the mass of the object is computed by multiplying the volume of each object voxel by its density and then totaling the individual voxel masses. If the mass of an object exceeds a mass threshold, the object is concluded to be a threat.

It would be beneficial for the baggage scanning equipment to automatically analyze the acquired density data and determine if the data indicate the presence of any contraband items, e.g., explosives. This automatic explosive detection process should have a relatively high detection rate such that the chances of missing an explosive in a bag are small. At the same time, the false alarm rate of the system should be relatively low to substantially reduce or eliminate false alarms on innocuous items. Because of practical considerations of baggage throughput at large commercial airports, a high false alarm rate could reduce system performance speed to a prohibitively low rate.

In the assignee's CT baggage scanning system as described and claimed in the U.S. patent applications listed above and incorporated herein by reference, threat items such as explosives are identified and classified in general by analyzing mass and/or density of identified objects. Voxels in CT data for a piece of baggage are associated with density values. Voxels having density values within certain predetermined ranges of density can be identified and grouped together as objects. After objects are thus identified, a discrimination approach is applied in which identified objects can be classified as to whether they pose a threat. Using voxel volumes and densities, masses of identified objects are compared to predetermined mass thresholds. Analysis of this comparison and other predetermined discrimination parameters is used to determine whether the identified object can be classified as a threat object.

In such a system, it would be beneficial to implement a system which could detect and classify thin objects such as sheet explosives which have been concealed such as by enclosing them in electronic equipment or placing them, i.e., "sandwiching," within or between items such as magazines and books. It would be additionally beneficial to achieve this detection while not suffering a substantial degradation in false alarm rate.

SUMMARY OF THE INVENTION

The present invention is directed to an apparatus and method for processing computed tomography (CT) data for a region to identify items in the region such as sheet-shaped explosives which have been concealed such as by packing them in electronic equipment or sandwiching them in items such as magazines or books. The region can include at least a portion of the inside of a container such as a piece of baggage or luggage. The invention is applicable to an automatic baggage scanning system which can automatically detect objects in the region and then discriminate objects to classify them as being threats or non-threats.

In one embodiment, the invention is applicable to a constant false alarm rate (CFAR) sheet detection process which identifies thin sheet-shaped objects. This form of sheet detection applies a statistical approach to determine whether each volume element or "voxel" in the CT density data is associated with a sheet object. Under this statistical approach, each voxel is analyzed by comparing its density to that of its neighboring voxels. In one embodiment, the mean and standard deviation of the densities of the neighboring voxels are computed. The difference between the density of the voxel being analyzed and the mean density of the neighboring voxels is compared to a predetermined threshold difference, which can be related to the standard deviation of the densities of the neighboring voxels. If the density of the voxel of interest differs from the mean density by more than the predetermined threshold difference, then it is concluded that the voxel of interest is associated with a thin object, e.g., a sheet.

Typically, in situations in which concealment of a sheet object has been applied, such as the electronic and/or sandwich concealment to which the present application is applicable, the CFAR approach will miss voxels and may, as a result, cause a threat object to be cleared by the system. The invention can detect the concealment and alter the discrimination process to allow the object to be more readily classified as a threat.

The present invention is directed to a method and apparatus for processing computed tomography (CT) data for a region. A plurality of volume elements are identified in the CT data for the region. Each volume element is associated with a density value. Volume elements in the CT data that are associated with an object in the region are identified. At least one subregion in proximity to the object is identified and at least one property of the subregion is calculated. The object is processed according to the calculated property of the subregion.

In one embodiment, processing the object according to the calculated property of the subregion can include altering at least one discrimination parameter used during discrimination to determine whether the object poses a threat. For example, if a particular concealment configuration is detected, a mass threshold can be lowered to allow the object to be readily classified as a threat. In an alternative embodiment, where a particular concealment configuration is detected, rather than altering a discrimination parameter, the object can be directly classified as to whether it poses a threat.

In one embodiment, the at least one subregion contains the object. The subregion can be a rectangular subregion containing the object and can be the smallest rectangular subregion that contains the object. In another embodiment, the at least one subregion is a layer on one side of a sheet-like object. A second subregion or layer can be defined on the opposite side of the sheet-like object.

In one embodiment, the rectangular subregion has planar edges that are parallel to planes containing the orthogonal axes of the rectangular coordinate system of a CT scanning system used to obtain the CT data for the region. In another embodiment, the rectangular subregion has planar edges that are parallel to planes containing the orthogonal axes of a rectangular coordinate system of the object. In this embodiment, the rectangular coordinate system of the object is determined using a principle component analysis. The rectangular subregion can also be larger than the smallest rectangular region that encloses the object. In this case, the smallest rectangular region that encloses the object is expanded such that the voxel data for regions surrounding the object can be analyzed. The expansion can be accomplished by a process such as dilation or by adding voxels to the smallest rectangular subregion in all three dimensions.

In one embodiment, the at least one property of the subregion is the mean of the density values of volume elements in the subregion. In another embodiment, the property is the standard deviation of the density values of volume elements in the subregion. The mean of the density values can be compared to a first threshold, and the standard deviation of the density values can be compared to a second threshold. The object can be classified based on either or both of these comparisons. In one embodiment, the object is classified as a threat if the standard deviation is below the second threshold, i.e., if the standard deviation of the region indicates that the region is occupied by a uniform object. Under these circumstances, in one embodiment, the object can be identified as being sandwiched in an item such as a book or magazine. In another embodiment, if the mean of the density values exceeds a predetermined threshold, that is, if the density of the region adjacent to the object is above a certain level, then the object can be classified as a threat object. In still another embodiment, these two requirements, i.e., that the standard deviation of density values of the region be below a threshold and that the mean of the density values be above another threshold, are combined. If both requirements are met, the object can be classified as a threat.

In one embodiment, the at least one property of the subregion is a count of the number of volume elements in the subregion that have density values within a predetermined range of density values. That number can be compared to the number of volume elements in the object. In an alternative embodiment, the number is compared to the number of volume elements in the subregion containing the object. If the ratio of the two numbers exceeds a predetermined threshold, then the object can be classified using the comparison. This classification can include concluding that the object is a sheet concealed in an electronic device. In response to that conclusion, discrimination parameters such as mass thresholds can be altered to more readily classify the object as a threat.

The concealment identification apparatus and method of the invention provides substantial improvement in automatic object identification, classification and/or discrimination in CT scanning systems. Particularly, the approach provides great improvements in the ability to detect threat items in baggage in CT baggage scanning systems. By providing a method by which particular forms of concealment can be identified, the overall detection rate of the system and overall false alarm rate of the system can be greatly improved.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

The present invention provides an apparatus and method which detect, identify and/or classify objects in CT data for a region. The region can include the interior of a piece of baggage or luggage being carried or checked onto a commercial aircraft. The objects identified by the invention can be objects known to pose threats to persons at an airport or on board an aircraft. These objects can include explosive objects and materials. In that regard, the invention is specifically directed to detection of thin objects such as sheet explosives which can be concealed in objects such as electronics systems or located in close proximity to, or "sandwiched" within, objects such as magazines or books. The invention can be implemented in a CT baggage scanning system of the type described and claimed in the copending U.S. patent applications listed above and incorporated herein by reference.

Throughout the following description, it is noted that many thresholds, such as density thresholds, mass thresholds, density-dependent mass thresholds, and difference thresholds as well as process parameters are used to carry out the various methods of the invention. These thresholds and parameters are determined based on extensive analysis of the CT data, such as actual three-dimensional CT density data, for many actual threat and non-threat objects. This analysis includes statistical analysis of the data employing statistical methods such as simulated annealing and genetic algorithms. In accordance with the invention, this analysis allows for threshold and/or parameter selection based on a particular objective to be met, e.g., false alarm and/or detection rate setting/optimization, discrimination of explosive type, etc., as described below.

Figure 1:
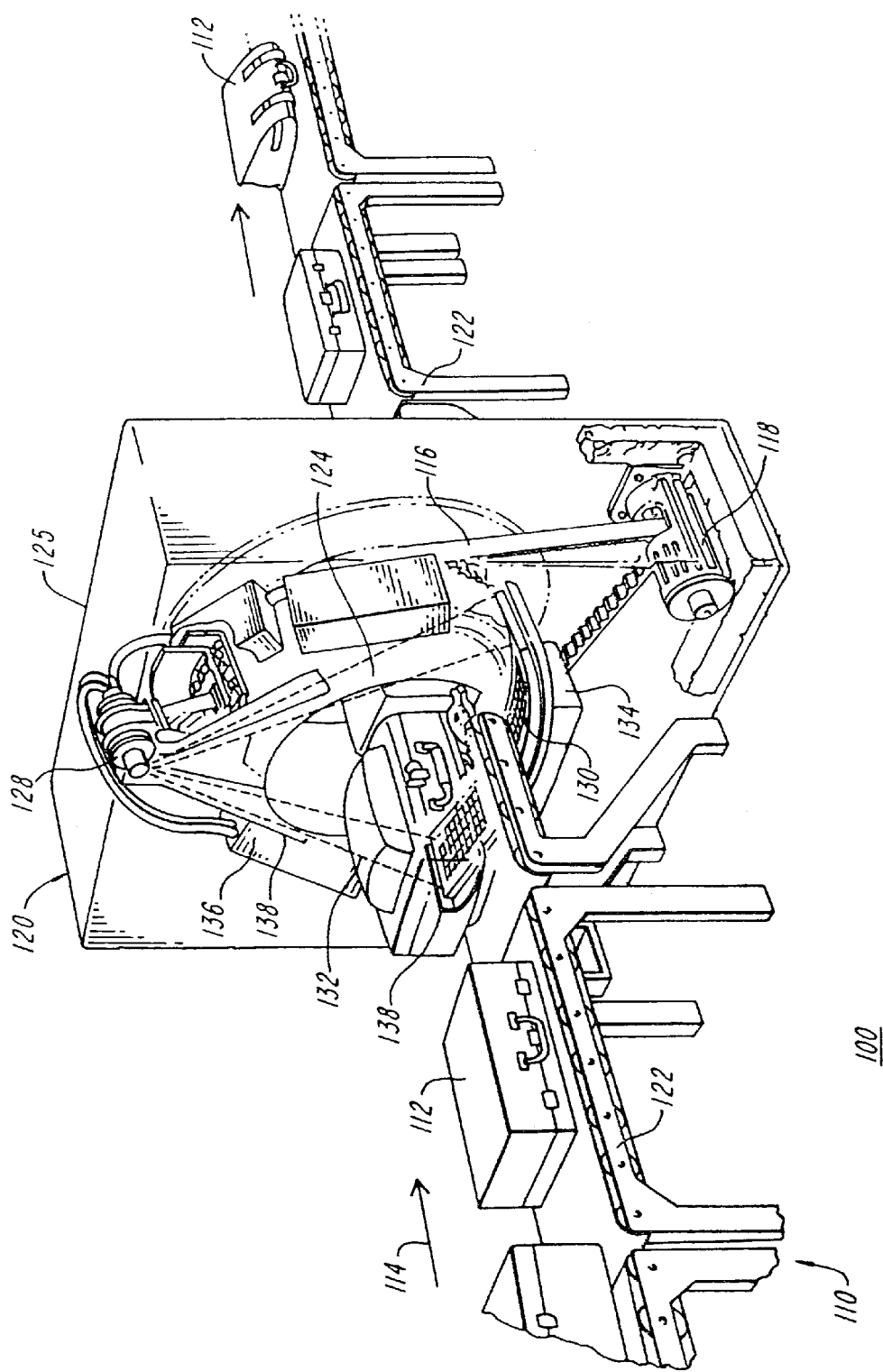
FIG. 1 contains a perspective view of a baggage scanning system in accordance with the present invention.
Figure 2:
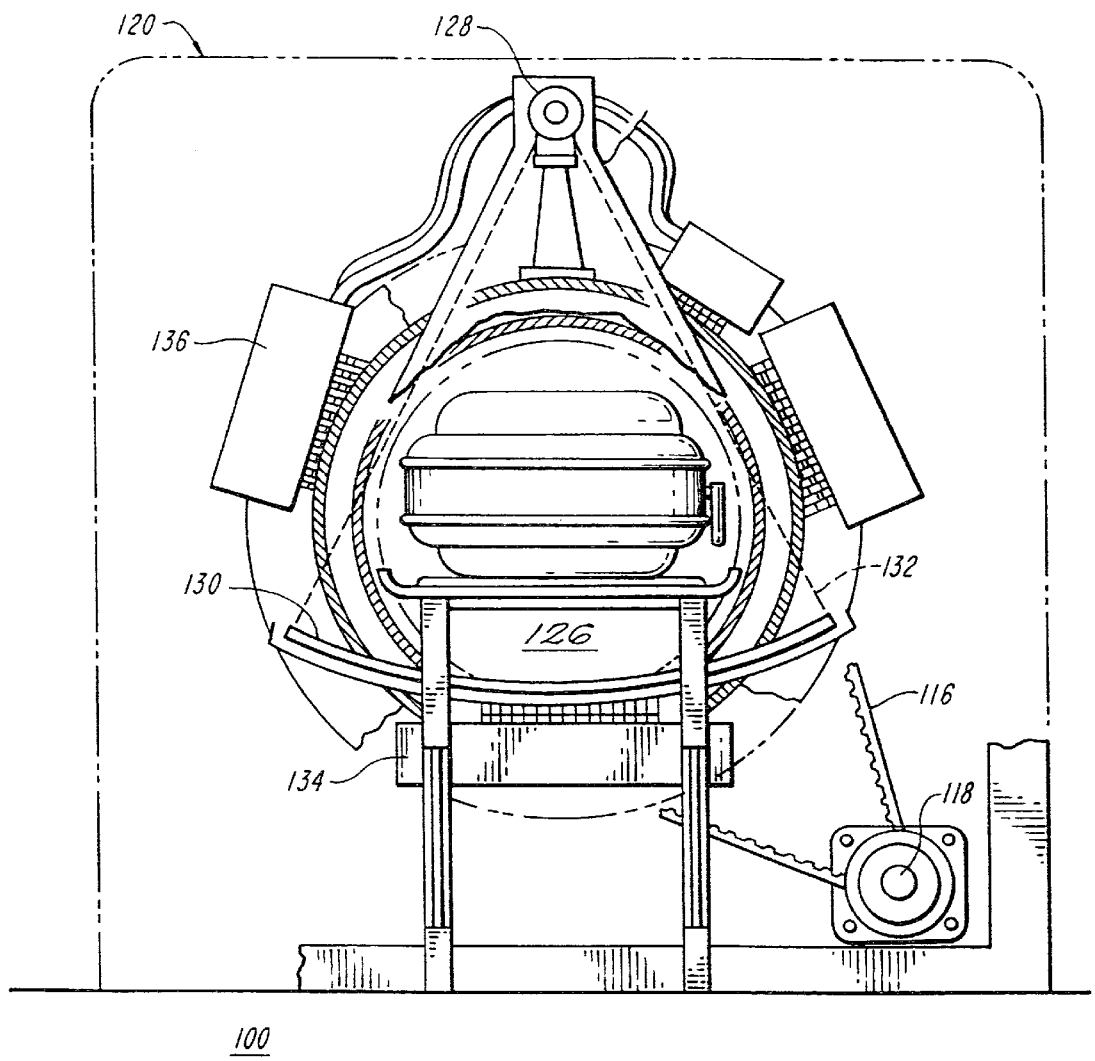
FIG. 2 contains a cross-sectional end view of the system shown in FIG. 1.
Figure 3:
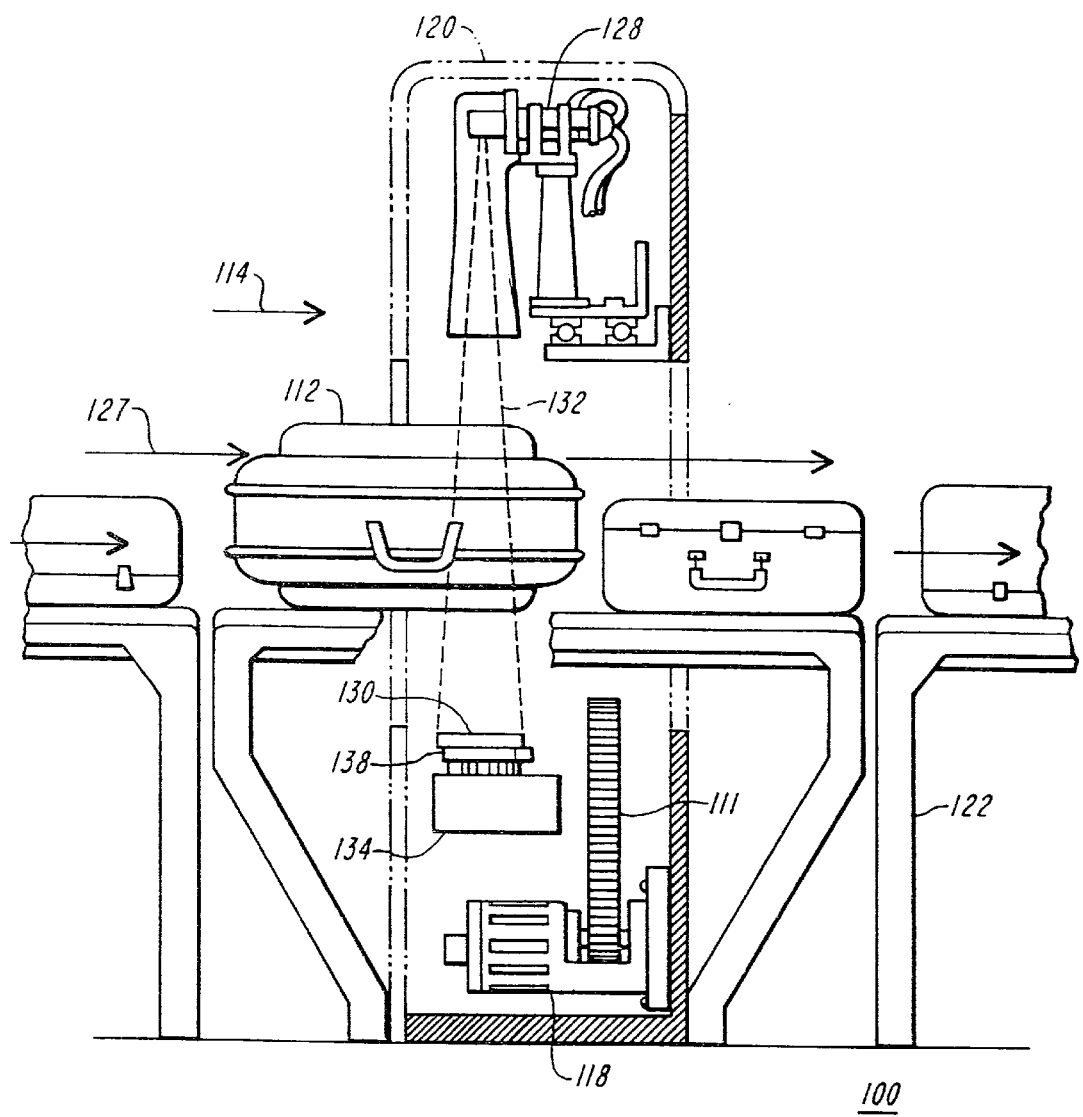
FIG. 3 contains a cross-sectional radial view of the system shown in FIG. 1.

FIGS. 1, 2 and 3 contain perspective, end cross-sectional and radial cross-sectional views, respectively, of a baggage scanning system 100 constructed in accordance with the invention, which provides object detection, identification, classification and/or discrimination in accordance with the invention. The baggage scanning system 100 generates CT data for a region which can include a piece of baggage. The system can use the CT data to generate image volume elements or "voxels" for the region. The baggage scanning system can be of the type described in the copending U.S. patent applications listed above.

The system 100 includes a conveyor system 110 for continuously conveying baggage or luggage 112 in a direction indicated by arrow 114 through a central aperture of a CT scanning system 120. The conveyor system includes motor driven belts for supporting the baggage. Conveyor system 110 is illustrated as including a plurality of individual conveyor sections 122; however, other forms of conveyor systems may be used.

The CT scanning system 120 includes an annular shaped rotating platform or disk 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the assignee of the present application and which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 can be a two-dimensional array such as the array described in a copending U.S. patent application Ser. No. 08/948,450 entitled, "Area Detector Array for Computed Tomography Scanning System," filed on Oct. 10, 1997. The system 120 further includes a data acquisition system (DAS) 134 for receiving and processing CT data signals generated by detector array 130, and an X-ray tube control system 136 for supplying power to, and otherwise controlling the operation of, X-ray tube 128. The system 120 is also preferably provided with a computer processing system for processing the output of the data acquisition system 134 and for generating the necessary signals for operating and controlling the system 120. The computer system can also include a monitor for displaying information including generated images. The X-ray tube control system 136 can be a dual-energy X-ray tube control system such as the dual-energy X-ray tube control system described in U.S. Pat. No. 5,661,774, issued on Aug. 26, 1997, entitled, "Dual Energy Power Supply," which is assigned to the same assignee as the present application and which is incorporated herein in its entirety by reference. Dual energy X-ray techniques for energy-selective reconstruction of X-ray CT images are particularly useful in indicating a material's atomic number in addition to indicating the material's density, although it is not intended that the present invention be limited to this type of control system. It is noted that the detailed description herein of the invention describes the details in connection with single-energy data. It will be understood that the description is applicable to multiple-energy techniques. System 120 also includes shields 138, which may be fabricated from lead, for example, for preventing radiation from propagating beyond gantry 125.

In one embodiment, the X-ray tube 128 generates a pyramidically shaped beam, often referred to as a "cone beam," 132 of X-rays that pass through a three-dimensional imaging field, through which baggage 112 is transported by conveying system 110. After passing through the baggage disposed in the imaging field, cone beam 132 is received by detector array 130 which in turn generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the baggage is continuously transported through central aperture 126 by conveyor system 110 so as to generate a plurality of projections at a corresponding plurality of projection angles.

In a well known manner, signals from the detector array 130 can be initially acquired by data acquisition system 134, and subsequently processed by a computerized processing system using CT scanning signal processing techniques. The processed data can be displayed on a monitor, and/or can also be further analyzed by the processing system as described in detail below to determine the presence of a suspected material. For example, the CT data can be analyzed to determine whether the data suggest the presence of material having the density (and when a dual energy system is used, molecular weight) of explosives. If such data are present, suitable means can be provided for indicating the detection of such material to the operator or monitor of the system, for example, by providing an indication on the screen of the monitor by sounding an audible or visual alarm, and/or by providing an automatic ejection device (not shown) for removing the suspect bag from the conveyor for further inspection, or by stopping the conveyor so that the suspect bag can be inspected and/or removed.

As stated above, detector array 130 can be a two-dimensional array of detectors capable of providing scan data in both the directions of the X- and Y-axes, as well as in the Z-axis direction. During each measuring interval, the plurality of detector rows of the array 130 generate data from a corresponding plurality of projections and thereby simultaneously scan a volumetric region of baggage 112. The dimension and number of the detector rows are preferably selected as a function of the desired resolution and throughput of the scanner, which in turn are a function of the rotation rate of rotating platform 124 and the speed of conveying system 110. These parameters are preferably selected so that in the time required for a single complete rotation of platform 124, conveying system 110 advances the baggage 112 just enough so that the volumetric region scanned by detector array 130 during one revolution of the platform is contiguous and non-overlapping with (or partially overlapping with) the volumetric region scanned by detector array 130 during the next revolution of the platform.

Conveying system 110 continuously transports a baggage item 112 through CT scanning system 120, preferably at constant speed, while platform 124 continuously rotates at a constant rotational rate around the baggage items as they pass through. In this manner, system 120 performs a helical volumetric CT scan of the entire baggage item. Baggage scanning assembly 100 preferably uses at least some of the data provided by the array 130 and a helical reconstruction algorithm to generate a volumetric CT representation of the entire baggage item as it passes through the system. In one embodiment, the system 100 performs a nutating slice reconstruction (NSR) on the data as described in U.S. Pat. No. 5,802,134, issued on Sep. 1, 1998, entitled, "Nutating Slice CT Image Reconstruction Apparatus and Method." The system 100 thus provides a complete CT scan of each bag, rather than only providing CT scanning of selected portions of baggage items, without the need for a pre-screening device. The system 100 also provides rapid scanning since two-dimensional detector array 130 allows the system 100 to simultaneously scan a relatively large portion of each baggage item with each revolution of the platform 124.

Figure 4:
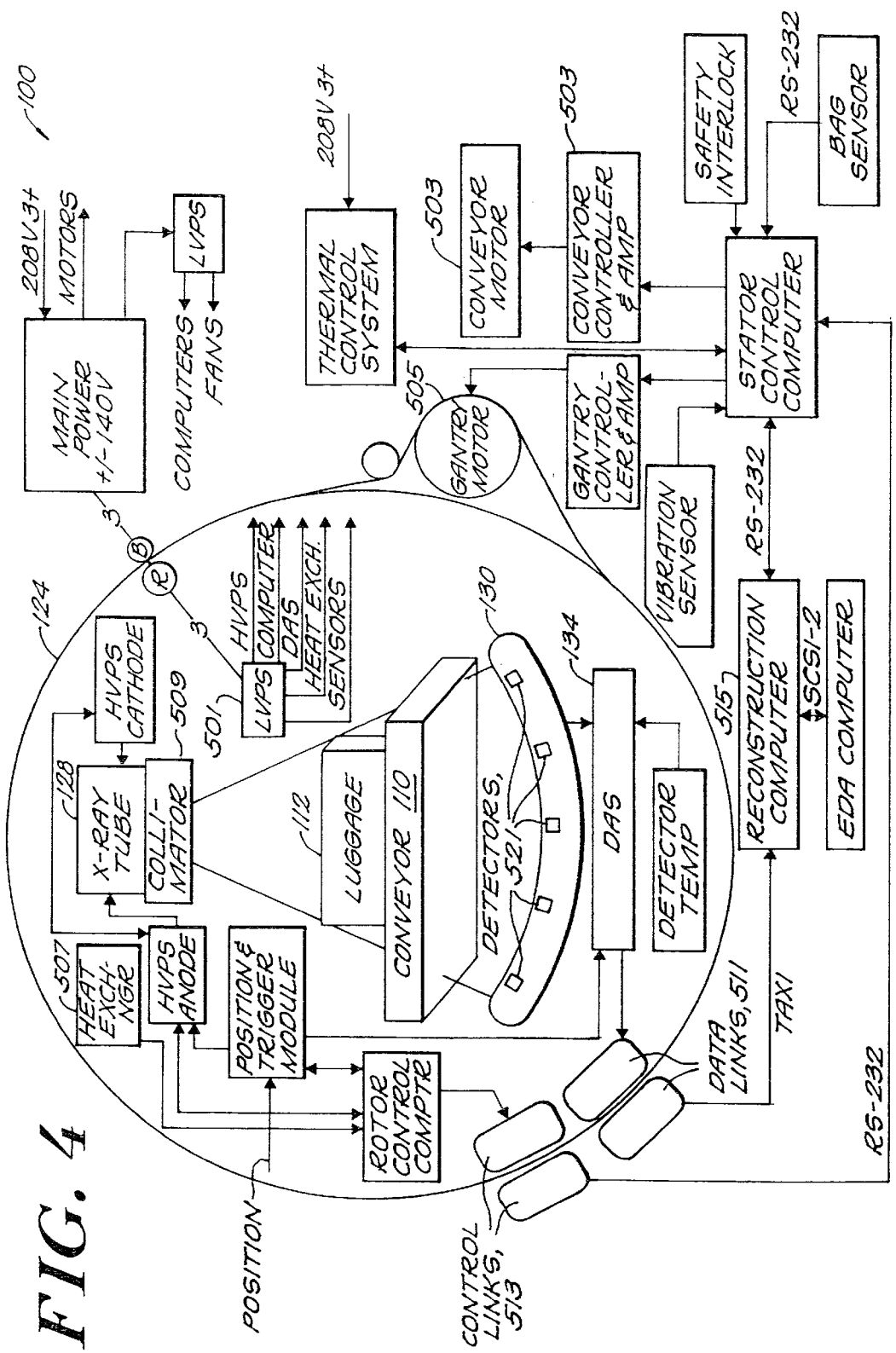
FIG. 4 contains a schematic electrical and mechanical block diagram of one embodiment of the baggage scanner of the invention.

FIG. 4 contains a mechanical/electrical block diagram of one embodiment of the baggage scanning system 100 of the invention. The mechanical gantry of the scanner 100 includes two major components, the disk 124 and the frame (not shown). The disk 124 is the rotational element which carries the X-ray assembly, the detector assembly 130, the data acquisition system (DAS) 134, a high-voltage power supply and portions of the monitor/control assembly, the power supply assembly and the data link assembly. The frame supports the entire system 100, including the baggage handling conveyor system 110. The disk 124 is mechanically connected to the frame via a duplex angular contact ball bearing cartridge. The disk 124 can be rotated at a constant rate by a belt which can be driven by a DC servomotor 505. The gantry also contains X-ray shielding on the disk and frame assemblies.

In one embodiment, the baggage conveyor system 110 includes a single belt driven at a constant rate to meet specified throughput requirements. The belt can be driven by a high-torque, low-speed assembly to provide a constant speed under changing load conditions. A low-attenuation carbon graphite epoxy material can be used for the portion of the conveyor bed in the X-ray. The total length of the conveyor is designed to accommodate three average length bags. A tunnel is used around the conveyor to meet the appropriate safety requirements of a cabinet X-ray system.

In one embodiment, input power of 208 volts, 3-phase, 30 amps services as the main supply which can provide power for the entire system. This input power can be supplied by the airport at which the system is installed. Power is transferred from the frame through a series of frame brushes which make continuous contact with the metal rings mounted to the disk 124. The low-voltage power supply 501 on the disk 124 provides power for the DAS 134, the X-ray cooling system and the various monitor/control computers and electronics. A low-voltage power supply on the frame provides power for the reconstruction computer and the various monitor/control electronics. The conveyor motor 503, the gantry motor 505, the high-voltage power supply and the X-ray coolant pump can all be supplied power directly from the main supply.

The high-voltage power supply provides power to the X-ray tube 128. The supply can provide a dual voltage across the cathode/anode. The driving waveform can be any desirable shape, and preferably is in the form of a sine wave. This supply can also provide X-ray filament power. The supply current can be held approximately constant for both voltages.

The dual-energy X-rays strike the baggage, and some portion of the X-rays pass through and strike the detector assembly 130. The detector assembly 130 performs an analog conversion from X-ray to visible photons and then to electrical current. The DAS 134 can sample the detector currents, multiplex the amplified voltages to a set of 16-bit analog-to-digital converters and multiplex the digital outputs to the computerized processing system 515, which generates CT data and processes the data in accordance with the invention as described below to detect, identify and classify objects in the piece of baggage 112. In one embodiment, the digital data from the DAS 134 are transferred to the processing system 515 via a non-contact serial data link 511. The DAS 134 can be triggered by the angular position of the disk 124.

The non-contact links 511 and 513 can transfer the high-speed digital DAS data to the processing system 515 and the low-speed monitor/control signals back and forth between the disk and frame control computers. The data link 511 can be based upon an RF transmitter and receiver.

In one embodiment, the image reconstructor portion of the processing system 515 converts the digital line integrals from the DAS 134 into a set of two-dimensional images of bag slices for both the high and low energies. The CT reconstruction can be performed via a helical-cone-beam solution, such as the nutating slice reconstruction method described in U.S. Pat. No. 5,802,134. The reconstructor can include embedded software, a high-speed DAS port, an array processor, a DSP-based convolver, an ASIC-based backprojector, image memory, UART control port, and a SCSI output port for image data. The array processor can perform data corrections and interpolation. The reconstructor can be self-hosted and can tag images based upon the baggage information received over the UART interface to the frame computer.

The processing system 515 can include a PC-based embedded control system. All subsystems can be monitored for key health and status information. This system can also control both motion systems, can sense baggage information, can control the environment, e.g., temperature, humidity, etc., can sense angular position of the disk 124 and can trigger the DAS and HVPS. This system can also have a video and keyboard interface for engineering diagnostics and control. Additionally, a control panel can be included for field service.

Most types of explosive objects can be grouped into a number of categories which can be based upon their shapes and/or constituent materials. For example, categories can include sheets, sticks, bulks and other categories based on shapes. Certain types of materials can be subdivided into subtypes which can also be based on containers such as cylinders. These categories have different typical features, such as shape, size, mass or density.

In one embodiment of the invention, a partial discrimination is first performed on the data to identify sheet-shaped objects. Next, a connection step, such as some form of connected components labeling (CCL), is performed to connect objects. Then, further discrimination is performed to classify identified objects according to potential threats. This is in contrast to prior systems such as the Eberhard et al. system which perform connection first and then discrimination, resulting in objects growing together, thus making object identification difficult.

In one embodiment, sheet explosive detection is based on a process known as a constant false alarm rate (CFAR) method, which statistically decides whether a volume element or voxel belongs to a sheet explosive. Sheet voxels can also be identified by a morphological sheet detection approach in accordance with the invention as described below in detail. In one embodiment, the voxels identified as sheet voxels by CFAR or the morphological sheet detection of the invention are then connected and labeled using a standard CCL process. The labeled objects can then be discriminated by their mass. If the mass of an object is greater than a predetermined threshold, the object can be declared a sheet explosive.

Figure 5:
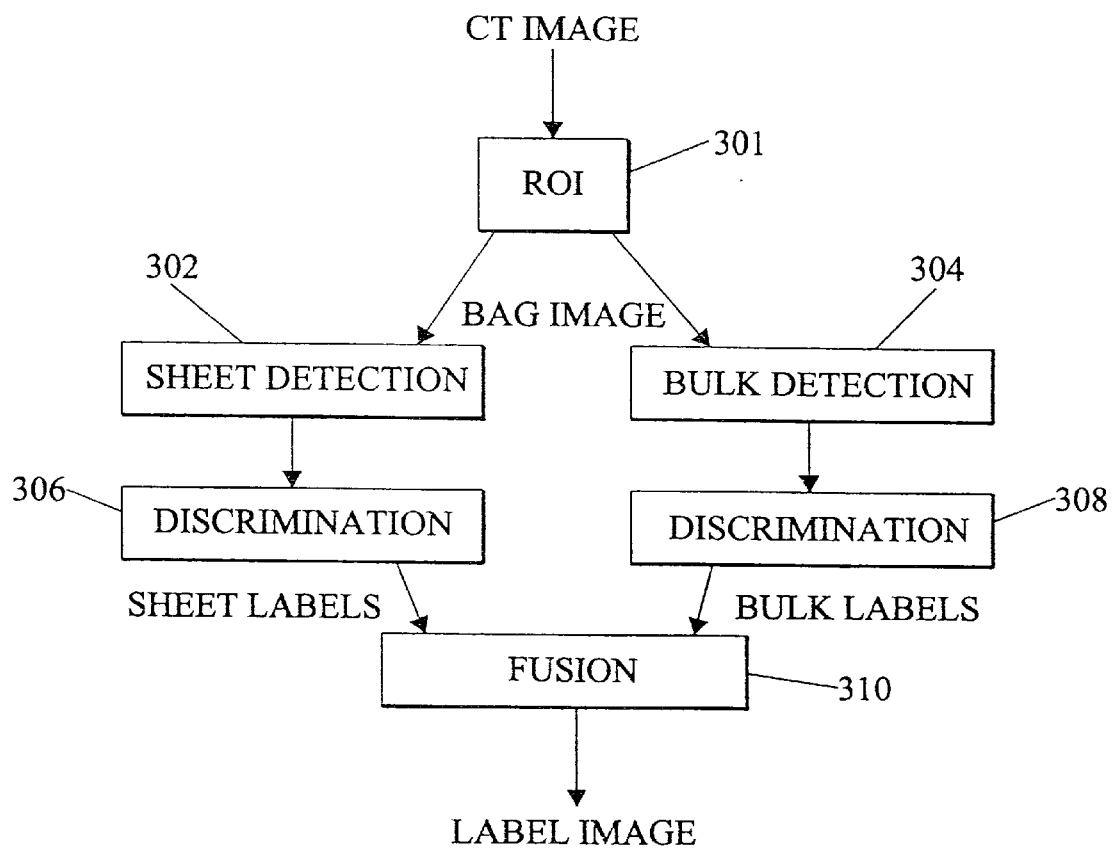
FIG. 5 contains a top-level flow diagram which illustrates the logical flow of one embodiment of the object identification method of the present invention.

FIG. 5 contains a top-level flow diagram which illustrates the logical flow of one approach to an object identification method to which the invention can be applied. In a first step 301, reconstructed CT image data are received and analyzed to define a region of interest (ROI) or bounding box for the region. This process eliminates voxels outside a bag and therefore reduces the size of the data set considerably. The method can then proceed along parallel paths including a sheet object detection path and a bulk object detection path.

Along the sheet detection path, sheet-shaped objects are detected in the sheet detection step 302. In the discrimination step 306, detected objects are analyzed to determine if they are threats. In one embodiment, this is done by comparing the mass of an object to a mass threshold. The discrimination step 306 produces label image data for the bag, which mark or label each of the individual voxels belonging to each sheet object and can identify physical properties of each sheet object (preferably density and mass) and their position in the bag. The label image data for each voxel can also identify the voxel according to an object with which it is identified or can identify the voxel as being background.

Along the bulk detection path, bulk-type objects are detected in the bulk detection step 304. Next, in the discrimination step 308, the detected bulk objects are analyzed to determine if they are threats. The discrimination step 308 produces label image data for the bag, which marks the voxels belonging to each bulk object and identifies physical properties of each bulk object (preferably density and mass) and their position in the bag.

The decision—data fusion step 310 takes the label image data produced by sheet and bulk detection steps and computes a single label image that corresponds to detected explosives. It will be understood that the method described in connection with FIG. 5 can include more than two separate detection paths, depending on the number of types of objects to be identified.

Throughout this application, the term "3-D image" and the symbol $C(i,j,k)$ are used to represent a set of CT slice images. The size of each CT slice is I columns by J rows. The symbol i in $C(i,j,k)$ represents the column index and runs from 0 to I−1. Similarly, the symbol j represents the row index and runs from 0 to J−1. There are K of these slices in a set. The symbol k represents one of these slices and runs from 0 to K−1. The function $C(i,j,k)$ is used to refer to or represent a particular CT density in this set, meaning that it is the CT density value at the ith column and the jth row of the kth slice. The CT densities are represented by positive integers with 0 (Hounsfield units) corresponding to the density of air and 1000 (Hounsfield units) corresponding to the density of water, although if desired other integer values can be used.

The function $C(i,j,k)$ can be considered a 3-D image being I pixels in width, J pixels in height, and K pixels in depth. Each element in the 3-D image is a voxel. The value $C(i,j,k)$ for a particular voxel denoted by the (i,j,k) triplet is the CT density of the material occupying that voxel.

The size of a voxel is determined by the resolution of the CT equipment. In one embodiment, the scanner has a nominal voxel size of 3.5 mm in width (x), 3.5 mm in height (y), and 3.33 mm in depth (z), which is a relatively small voxel and therefore produces higher resolution when compared to other systems, although the nominal size can vary depending on several design factors. Using this information and the CT density, it is possible to compute the mass of each voxel in a 3-D image.

CT densities approximately correspond to physical densities of material. Since the CT density of 1000 is made to correspond to the density of water (i.e., 1 gram/cc), in order to find the mass of a given voxel in grams, the CT density value of that voxel is divided by 1000 and multiplied by the volume of the voxel (0.35×0.35×0.333 cc). The method described in this application utilizes this conversion (as the constant $c_0$) to compute the bag mass and the mass of each identified object in the bag.

Figure 6:
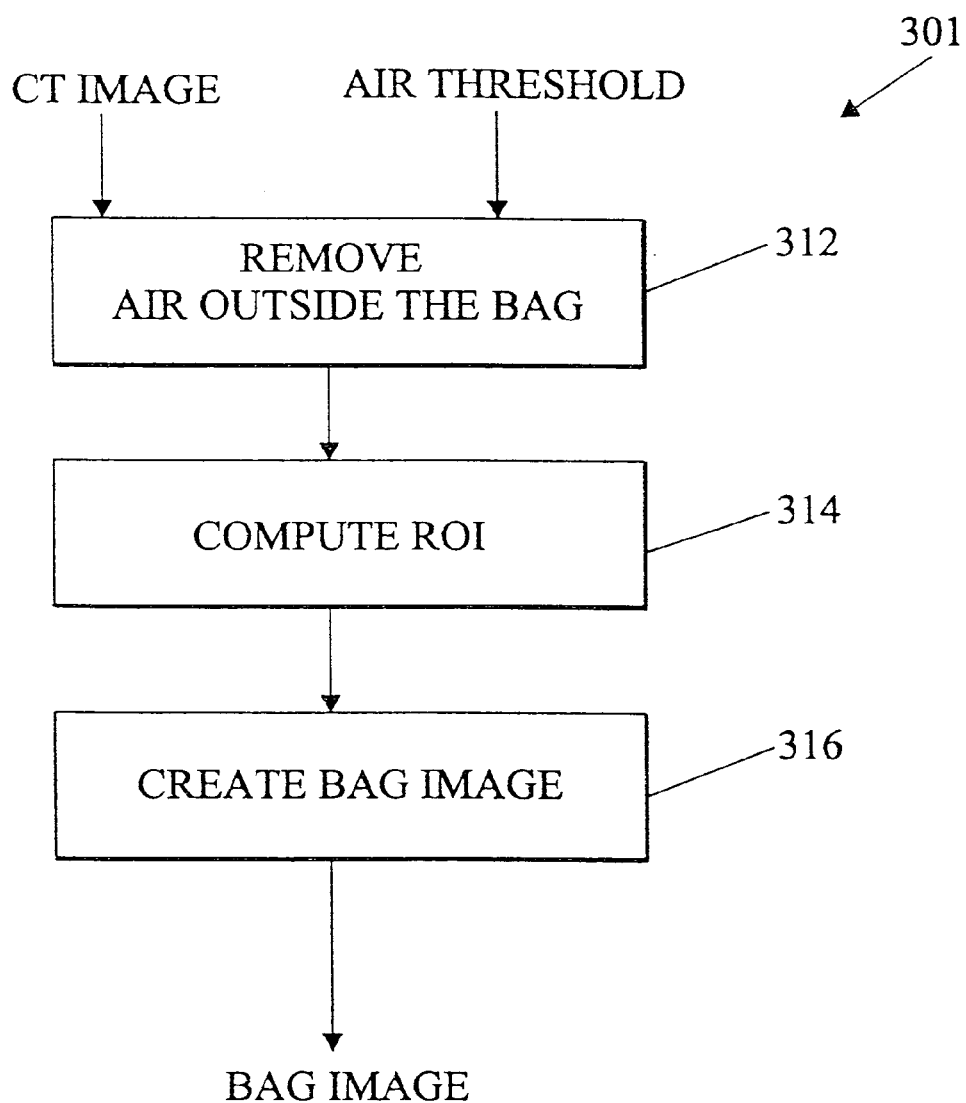
FIG. 6 contains a flow diagram of the logical flow of one embodiment of the region of interest calculation of the present invention.

The main steps in the method mentioned above and shown in FIG. 5 will now be described in detail. FIG. 6 contains a flow diagram of the logical flow of one approach to the region-of-interest calculation 301. The goal of the region of interest calculation is to eliminate parts of the image that lie outside the bag so that other parts of the process will have less data to analyze and therefore speed up the process and decrease the memory requirements. In one embodiment, a rectangular subset that contains all of the voxels with CT density values in the range of interest is extracted from the original image.

The inputs to the region-of-interest calculation include $C(i,j,k)$, which is the three-dimensional CT-image for a bag. The outputs include $C_{roi}(i,j,k)$, which represents the CT image of a bag region of interest and ($x_{min}$, $x_{max}$, $y_{min}$, $y_{max}$, $z_{min}$, $z_{max}$), which are coordinates of the region of the interest box. A parameter used in the calculation is $t_0$ which is the air-to-bag threshold. The method 301 begins by receiving the data representing the 3-D image of a bag, $C(i,j,k)$ and the value for the air threshold $t_0$. Next, in step 312, the voxels identified as containing data representing air are identified, and, in step 314, the coordinates for the region of interest are computed so as to exclude most if not all of those voxels. Steps 312 and 314 proceed as follows so as to define the region of interest:

$x_{min}$=minimum value of i such that at least one $C(i,j,k) \geq t_0$ for any j, k;

$x_{max}$=maximum value of i such that at least one $C(i,j,k) \geq t_0$ for any j, k;

$y_{min}$=minimum value of j such that at least one $C(i,j,k) \geq t_0$ for any i, k;

$y_{max}$=maximum value of j such that at least one $C(i,j,k) \geq t_0$ for any i, k, $z_{min}$=minimum value of k such that at least one $C(i,j,k) \geq t_0$ for any i, j;

$z_{max}$=maximum value of k such that at least one $C(i,j,k) \geq t_0$ for any i, j.

Figure 7:
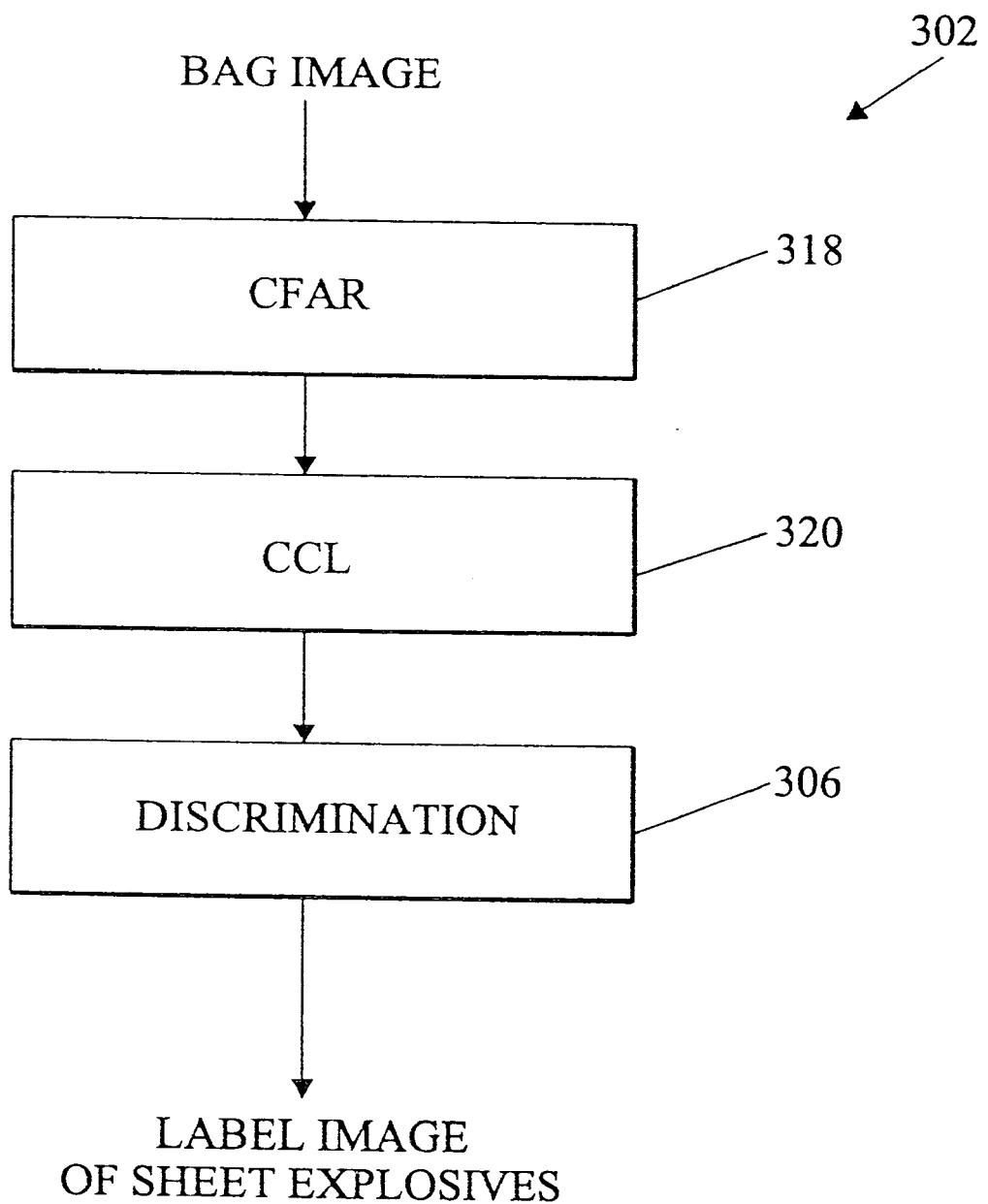
FIG. 7 contains a flow diagram of the logical flow of one embodiment of a sheet detection method in accordance with the present invention.

Next, the image of the region of interest, including the bag, is computed by $$C_{roi}(i,j,k)=C(i+x_{min},j+Y_{min},k+z_{min}),$$

where $0 \leq i \leq x_{max}-x_{min}$ $0 \leq j \leq y_{max}-y_{min}$ $0 \leq k \leq z_{max}-z_{min}$ FIG. 7 is a flow diagram which illustrates the logical flow of one approach to a sheet detection method to which the present invention can be applied. Sheet explosives are characterized as being much thinner in one dimension (height, width, or depth) than in the other two. This dimension is referred to as the thickness of a sheet explosive. One sheet explosive detection method described herein is tunable to the sheet thickness and uses a constant false alarm rate (CFAR) method. Two-dimensional approaches to CFAR are described in, for example, Kreiten, et al., "Discriminating Targets from Clutter," Lincoln Lab Journal, Vol. 6, No. 1, 1993; Novak, et al., "Effects of Polarization and Resolution on the Performance of a SAR Automatic Target Recognition System," Lincoln Lab Journal, Vol. 6, No. 1, 1993; and Frosgate, et al., "Multiscale Segmentation and Anomaly Enhancement of SAR Imagery," IEEE Trans. on Imag. Proc., Vol. 6, No. 1, 1997; all of which are incorporated herein by reference. Under one three-dimensional CFAR approach to which the invention can be applied, a CFAR sheet voxel analysis step 318 is performed on the CT image data for the region of interest to identify which voxels are associated with sheet objects. Next, a connected components labeling (CCL) method can be applied in step 320 to sheet voxels to connect them within individual objects. In step 306, the objects are classified such as by mass discrimination.

Figure 8A:
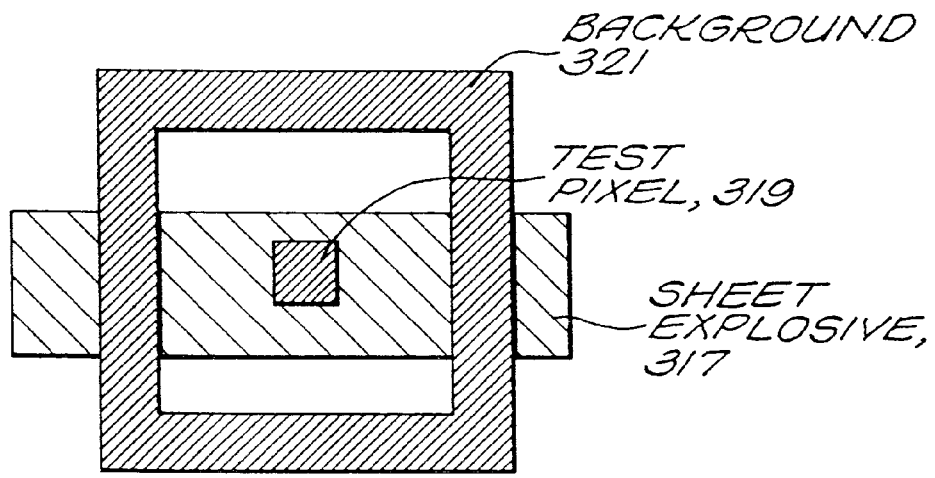
FIGS. 8A and 8B schematically illustrate the sheet object detection method of FIG. 7.
Figure 8B:
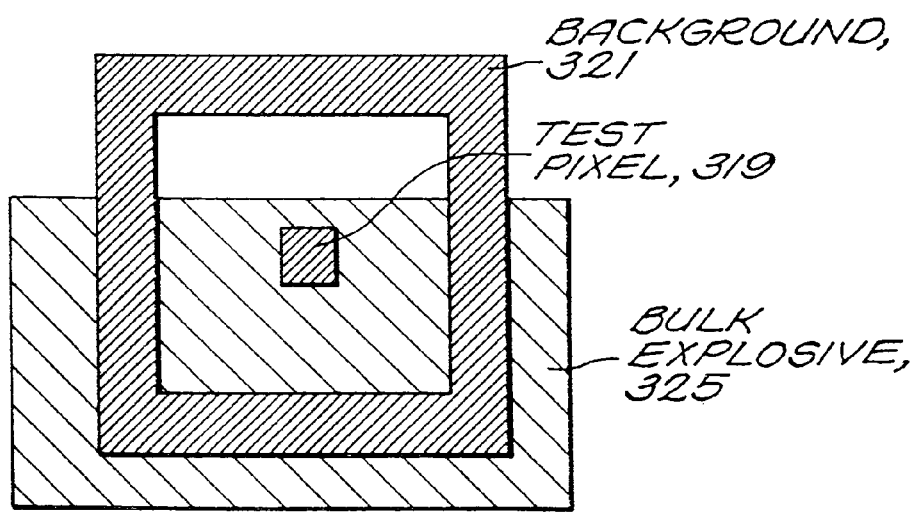

Under the CFAR method, each voxel in the bag is examined to determine whether it is part of a sheet explosive. To be part of a sheet explosive a voxel should have a density value within a certain range of CT density values and should be statistically distant from its background. Under one approach, the background is defined as the voxels on the surface of a cube of size comparable to the sheet thickness that is centered around the test voxel as shown in FIGS. 8A and 8B, which are schematic diagrams of a CFAR method to which the present invention can be applied. FIG. 8A shows in two dimensions the background cube 321 including a test voxel 319 being applied to CT data voxels that include a sheet object 317. The mean and standard deviation of the densities of the background voxels around the test voxel are computed. The value of the test voxel is compared against the mean and standard deviation of the background. If the statistical distance of the test voxel to its background is larger than a predetermined threshold, then the test voxel is said to belong to a sheet explosive.

In one alternative approach, all of the voxels on the surfaces of the cube are not used to compute the mean and standard deviation. To save processing time, the voxels at a surface can be sampled, and only the sampled voxels can be used in the computation of the mean and standard deviation. In one embodiment, only every other voxel is sampled, resulting in savings of half the processing time required to generate the mean and standard deviation.

In another alternative approach, three separate two-dimensional CFAR calculations can be performed in the three orthogonal Cartesian planes, x-y, x-z, y-z. A voxel mean and standard deviation of the background are computed for each plane, the background being defined as the voxels on the perimeters of a square in the respective plane. Then, statistical distances are computed for each plane and are compared to a predetermined threshold. Different coordinate planes may have different thresholds. The number of planes in which the threshold is exceeded is used to determine whether the voxel is a sheet voxel. For example, if one or more thresholds are exceeded, then it can be concluded that the voxel is a sheet voxel. In another embodiment, the voxel is labeled a sheet voxel if two or more thresholds are exceeded.

In the cases of the CFAR method described above, an upper threshold in addition to or instead of the lower threshold can be employed. This will eliminate sheet-shaped objects which have very high contrast with background. An example of such a sheet would be the outer surface of the bag.

As shown in FIG. 8B, for a bulk object 325, the background voxels cover more of the object itself. Hence, the background becomes statistically close to the test voxel which is chosen to be in the test object. Therefore, the CFAR distance is large for thin sheet-like objects and small for thick bulk-like objects. This property is used to detect all voxels that belong to sheet-like objects and eliminate all voxels that belong to bulk objects in the bag.

After deciding which voxels to consider as sheets, the CCL analysis 320 is performed on the sheet voxels to combine the voxels into a sheet object. The mass of each connected component thus obtained is compared against a predetermined mass threshold to decide the presence of a sheet explosive. In general, sheet-shaped objects that exceed a predetermined threshold mass are concluded to be explosives.

As noted above, the goal of the sheet explosive detection method is to detect sheet-like objects. A separate sheet explosive detection step is used to solve the problem of sheets being inadvertently removed from the data during morphology steps such as erosion that may be performed during the bulk detection process. The inputs to the sheet detection method include $C_{roi}(i,j,k)$, which is the 3-D image of the region of interest (size $I_{roi} \times J_{roi} \times K_{roi}$). The outputs of sheet explosive detection include the following:

$L_s(i,j,k)$, Label image for sheet explosives (same size as $C_{roi}$);

$N_s$, Number of detected sheet explosives;

$\rho_n$, Density of each detected object;

$M_n$, Mass of each detected object; and $(x^n_{min}, x^n_{max}, y^n_{min}, y^n_{max}, z^n_{min}, z^n_{max})$, Bounding box for each detected object.

A bounding box as used in connection with this and other aspects of the invention is defined as the smallest rectangular region which contains the object that it bounds. The parameters for sheet detection include the following:

$(\rho^s_{min}, \rho^s_{max})$, CT-density range of interest for sheets;

g, CFAR guard size, i.e., size of the CFAR cube around the test pixel in voxels;

$t_1$, CFAR decision threshold;

$\Delta_s$, CCL threshold;

$c_s$, CCL connectivity type (any combination of "face", "edge", or "vertex");

$m_s$, Mass threshold for sheet explosive detection; and $c_0$, CT density-to-mass conversion factor.

In one embodiment, the steps in the sheet explosive detection method include the following:

1. Start with the 3-D image of the ROI, $C_{roi}(i,j,k)$.

2. Pad the image with g layers of voxel values having some preset background value, e.g., zero, on each side to create a padded image, $P(i,j,k)$ of size $(I_{roi}+2g) \times (J_{roi}+2g) \times (K_{roi}+2g)$, $$P(i, j, k) = \begin{cases} C_{roi}(i-g, j-g, k-g), & \text{if } g \leq i < (I+g), \text{ and} \\ & g \leq j < (J+g), \text{ and} \\ & g \leq k < (K+g); \\ 0, & \text{otherwise} \end{cases} \quad (1)$$

3. Raster scan the padded image and find the voxels, $\{v_0=(i_0,j_0,k_0), v_1=(i_1,j_1,k_1), \ldots v_n \ldots\}$, with a CT density between $\rho^s_{min}$ and $\rho^s_{max}$. A shorthand notation $v_n$ is used to denote a voxel, $0 \leq n < (I_{roi}+2g)(J_{roi}+2g)(K_{roi}+2g)$.

4. For each voxel $v_n=(i,j,k)$, the surface of the CFAR cube, $S_n$, is defined as the surface voxels $v_{n'}=(i',j',k')$ of the $(2g+1) \times (2g+1) \times (2g+1)$ cube centered at $v_n$:

$$(i', j', k') \in S_n \tag{2}$$

$$\text{if } \begin{cases} j-g \leq j' \leq j+g, k-g \leq k' \leq k+g, i' = i \pm g \\ i-g \leq i' \leq i+g, k-g \leq k' \leq k+g, j' = j \pm g \\ i-g \leq i' \leq i+g, j-g \leq j' \leq j+g, k' = k \pm g \end{cases}$$

The number of voxels in $S_n$ (the surface area of the cube) is equal to $$A_{S_n} = 24g^2 + 2.$$

5. On the surface $S_n$ of the CFAR cube centered around each $v_n$, compute the mean, $\mu_n$, $$\mu_n = \frac{1}{A_{S_n}} \sum_{v_{n'} \in S_n} P(v_{n'}) \tag{3}$$

6. On the same surface compute the standard deviation, $\sigma_n$, $$\sigma_n = \sqrt{\frac{1}{A_{S_n}} \sum_{v_{n'} \in S_n} P(v_{n'}) - \mu_n^2} \tag{4}$$

7. Compute the distance, $d_n$, of the voxel $v_n$ to the background given by $\mu_n$ and $\sigma_n$, $$d_n = \frac{P(v_n) - \mu_n}{\sigma_n} \tag{5}$$

8. Create a CFAR image CFAR(i,j,k), same size as input image $C_{roi}(i,j,k)$ (not zero padded), consisting only of the voxels whose distance, $d_n$, exceeds the threshold $t_1$.

$$CFAR(i-g, j-g, k-g) = \begin{cases} P(i, j, k) & d_n \geq t_1 \\ 0 & \text{otherwise} \end{cases} \tag{6}$$

9. Perform connected component labeling (CCL) using the CCL parameters, $\Delta_s$ and $c_s$, on the CFAR image, CFAR (i,j,k), to produce a label image $L_s(i,j,k)$ and bounding boxes, $$(x^n_{min}, x^n_{max}, y^n_{min}, y^n_{max}, z^n_{min}, z^n_{max}),$$

$$L_s(i, j, k) = \begin{cases} \text{object label } 0 < l \leq N_s & \text{for CCL objects} \\ 0 & \text{otherwise} \end{cases} \tag{7}$$

10. For each object $l=1, \ldots N_s$ the mass $M_l$ is computed during the CCL.

$$M_l = c_0 \sum_{i,j,k} CFAR(i, j, k) h(L_s(i, j, k), l) \tag{8}$$

where the selector function, h(x,l), is defined as $$h(x, l) = \begin{cases} 1 & x = l \\ 0 & \text{otherwise} \end{cases} \tag{9}$$

11. Eliminate all objects whose mass, $M_l$, is below the given mass threshold, $m_s$.

$$L_s(v_n) = 0 \text{ if } M_{L_s(v_n)} < m_s \tag{10}$$

12. Renumber the remaining objects using consecutive positive integer labels and update the label image. Set $N_s$ equal to the number of remaining objects.

It should be noted that, with respect to the sheet detection method, the variance $\sigma^2_n$ can be used in place of the standard deviation $\sigma_n$ in step 5. This can increase the execution speed of the implementation. Also, shapes other than a cube could be used to define a CFAR surface. In addition, thick sheet explosives can be detected by the bulk path of the method of the invention. Therefore, in one embodiment, the thickness of sheets to be detected can be set to be slightly thicker than the thinnest sheet that can be detected by bulk detection.

Hence, the CFAR decision to label a voxel as being part of a sheet-like object is based on two characteristics of the voxel density with respect to its surroundings. The density of the test voxel must be different from the background, and this difference must be significant compared to the standard deviation of the background density. When the density difference is small, or when the background is nonuniform, the CFAR may lose some of the voxels belonging to a sheet explosive object. As a result, the sheet-like object may be concluded to be smaller or to have less mass than it actually does. This can lead to incorrectly classifying the object as a non-threat object.

This effect of losing sheet voxels can be caused by several factors. For example, some approaches to concealment of sheet-like explosives can lead to the loss of sheet-object voxels. Two particular types of concealment are of interest. First, sheets can be located within electronics devices. Very dense components of an electronics device adjacent to a sheet explosive can produce a nonuniform background density due to image artifacts. Another effect of these artifacts is that they can cause the observed density of the explosive material sheet to fall outside the density range of interest and, therefore, can cause the sheet to be classified as a non-threat object. Another type of concealment that can result in misclassification is the use of uniform bulky objects, such as books or magazines, to form a "sandwich-like" structure around the sheet explosive. That is, the sheet explosive can be concealed by placing it between the pages of a book or magazine. In this case, the density of the regions surrounding the sheet is uniform, but the difference in density between the surrounding regions and the explosive material is small. As a result, parts of the sheet explosive object are lost and its total detected mass is reduced.

Another potential difficulty presented by electronic concealment of sheet explosives is related to discrimination based on texture. Typically, effective concealment of an explosive includes hiding the explosive so that it cannot be detected by visual inspection. To fit a sheet explosive inside a piece of electronics, the sheet has to be deformed and bent to occupy the empty space between electronic components. Close proximity to some of the plastic electronic parts can lead to a sheet explosive growing together with portions of the concealing object, thus further distorting its texture. As a result, texture-based discrimination features can potentially clear sheet explosives placed inside electronic devices.

The apparatus and method of the invention provide an approach to identifying and classifying sheet-like objects in proximity to electronics or located within a uniform object which can also have an absolute density close to that of the sheet-object, i.e., "sandwiched" within a book or magazine. When a sheet-like object is detected, the electronics and sandwich approach of the invention can be used to detect the electronics proximity and/or sandwich, and, in response, modify classification perimeters such that a concealed threat is not cleared by the system. The invention examines the surroundings of sheet-like objects. In one embodiment, if a sandwich-like environment is detected, mass thresholds used in classifying the object can be lowered. Likewise, if the analysis of the surroundings of the object suggests electronic concealment, then a different set of mass-density ranges can be used to identify threat objects. Under the sandwich identification approach, the mean and standard deviation of background density is measured in regions on each side of a flat sheet-like object. If, on either side, the mean is greater than the density of dry clothing and the standard deviation is low, suggesting a bulk object of similar density in the vicinity of a sheet, then, the mass thresholds used for classification of the object can be lowered.

Figure 9:
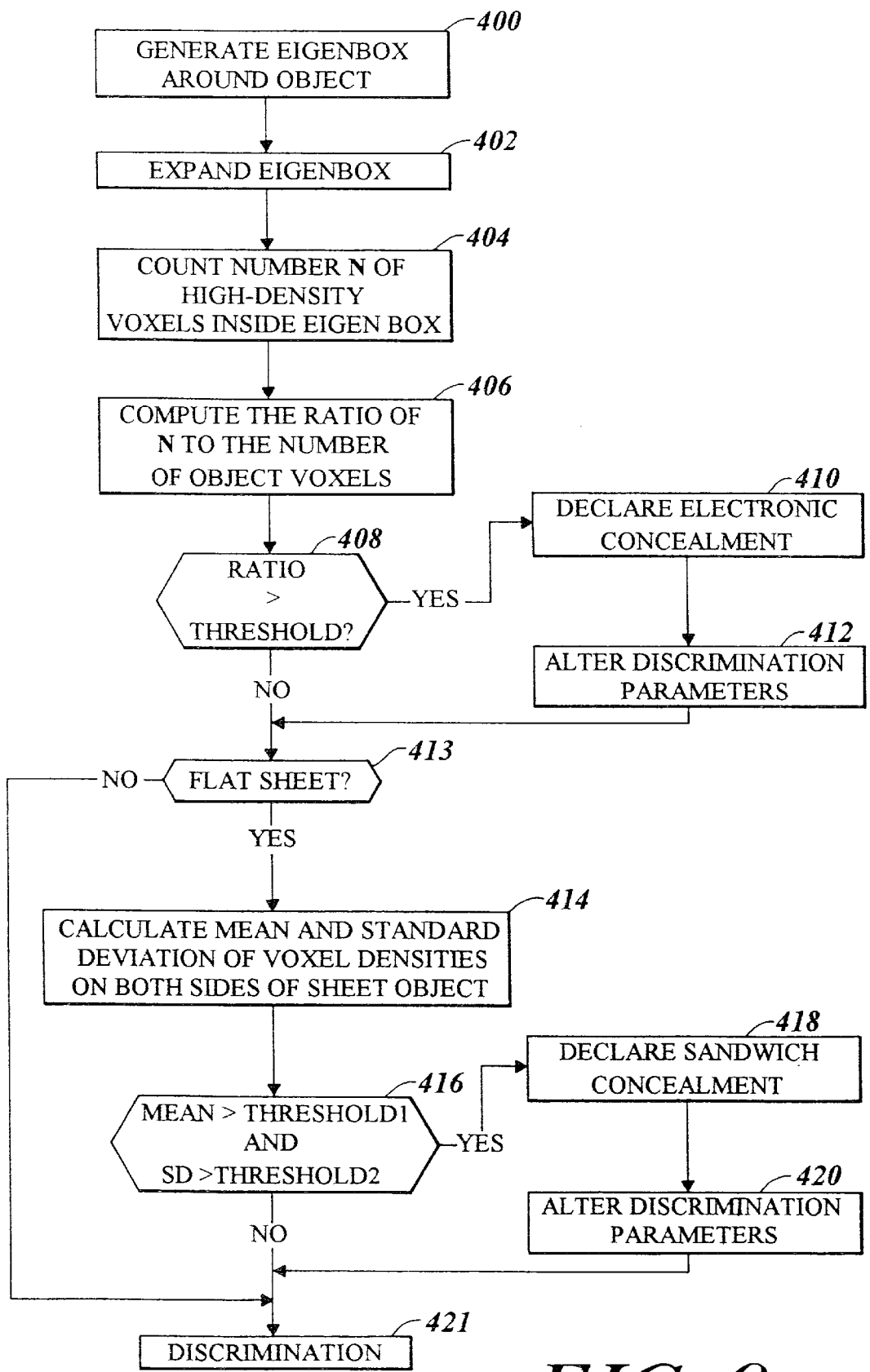
FIG. 9 contains a flow diagram of the logical flow of one embodiment of an approach to detecting and classifying objects under electronics or sandwich concealment in accordance with the present invention.

In general, the sandwich and electronics parameters are independent features of objects. However, as described in detail below, in one embodiment, a single process calculates both sets of parameters. FIG. 9 contains a schematic flow diagram which illustrates the logical flow of one embodiment of an approach to detecting and classifying objects under the electronics or sandwich concealment configurations. In step 400 of the process, an eigenbox aligned with a detected objects principle axis and encompassing the object is generated. The object eigenbox is defined as the smallest rectangular region of space aligned with the object's principle axis that contains the entire object. Next, in step 402, the eigenbox is expanded to allow for examination of the regions surrounding the object. In one embodiment, the expansion is carried out by a dilation operator, which can be of the type described in copending U.S. patent application Ser. No. 09/022,204, incorporated herein above by reference. Also, a region of interest in the three-dimensional CT image containing the expanded eigenbox is identified.

Next, in step 404, the number of relatively high-density voxels inside the eigenbox is counted. This includes setting a threshold for classification of a voxel as having high density. Voxels having density values that exceed the threshold are included in the count. Next, in step 406, the ratio of the count obtained in step 404 to the total number of object voxels is calculated. In an alternative embodiment, the ratio of the count obtained in step 404 to the total number of voxels in the eigenbox or subregion is computed. In step 408, a determination is made as to whether this ratio exceeds a preset threshold. If it does, in step 410, electronic concealment is declared. Next, in step 412, discrimination parameters are altered to allow the object to be classified as a threat item. For example, mass thresholds can be lowered. If the ratio does not exceed the threshold in step 408, then flow continues to step 414 where the process of identifying a possible sandwich configuration begins. Likewise, after discrimination parameters are altered in step 412 to account for electronic concealment, flow passes to the sandwich identification process beginning at step 413.

In step 413, it is determined whether the identified sheet object is in a flat configuration. This is done in accordance with the assumption that if the object is in the sandwich concealment configuration, it will be laying flat and not bent. The determination is made by comparing the thickness of the object to a predetermined threshold maximum thickness. In one embodiment, the threshold thickness is set to equal the parameter g, the CFAR guard size. If the sheet is determined to be in a flat configuration in step 413, then flow continues to step 414. If not, then flow advances past the sandwich concealment identification process and discrimination is performed in step 421.

In step 414, two regions on opposite sides of an identified sheet-like object are defined. Each region is defined as a layer adjacent to one of the two largest faces of the object's eigenbox. The thickness of a layer can be set to the CFAR guard size g. The mean and standard deviation of the densities in both regions on opposite sides of the object are calculated. In step 416, the mean calculated in step 414 is compared to a first threshold and the standard deviation is compared to a second threshold. If the mean exceeds the first threshold and the standard deviation on the same side of the object is less than the second threshold, i.e., if on at least one side the mean density is high and the standard deviation is low, then flow continues to step 418 where sandwich concealment is declared. Next, in step 420, discrimination parameters can be altered to allow the object to be classified as a threat. For example, again, mass thresholds and/or other parameters can be altered.

In accordance with the invention, object surroundings are examined in the coordinate system aligned with the object's principal axes. The electronics and sandwich process expands the object eigenbox along each principal axis to calculate the electronics and sandwich parameters. In one embodiment, each dimension of the eigenbox is increased by the same amount. If the thickness of the expanded eigenbox is less than the minimum value given by one of the process parameters, the eigenbox is expanded further along the principal axis corresponding to the object thickness to achieve the minimum thickness.

The expanded eigenbox approach calculates the gap between the object's eigenbox and its expanded eigenbox and also identifies a rectangular region of interest in the CT image of the bag in scanner coordinate space that contains this expanded eigenbox. All coordinates, sizes and dimensions are given in voxels.

The inputs to the process of computing the expanded eigenbox and region of interest are given as follows:

| | |
|---|---|
| I, J, K: | width, height and depth, respectively, of the CT image of the bag; |
| $(i, j, k)_{min}$, $(i, j, k)_{max}$: | object bounding box coordinates; |
| $e_1$: | eignvector along object's smallest (thickness) dimension; |
| $e_2$: | eignvector along object's second largest (width) dimension; |
| $e_3$: | eignevector along object's larget (length) dimension; |
| $m = (i_m, j_m, k_m)$: | object center-of-mass coordinates; |
| $l_1^{min}, l_1^{max}$: | object dimensions measured from m along $e_1$; |
| $l_2^{min}, l_2^{max}$: | object dimensions measured from m along $e_2$; and |
| $l_3^{min}, l_3^{max}$: | object dimensions measured from m along $e_3$. |

Parameters used in the process of calculating the expanded eigenbox and the region of interest include:

$G_{el}$: gap size around the object eigenbox for electronics check; and $T_{min}$: minimum thickness of the expanded eigenbox.

Outputs of the process of calculating the expanded eigenbox and the region of interest include:

| | |
|---|---|
| $(I, J, K)_{min}$, $(I, J, K)_{max}$: | corrdinates of the rectangualr image slab containing the expanded object eigenbox; and |
| $G_{thk}$: | actual gap around the object eigenbox in the thickness direction that satisfies the minimum thickness requirement. |

In one embodiment, the steps in the process of calculating the expanded eigenbox and the region of interest include the following:

1. Compare the object thickness $l_1^{max}-l_1^{min}$ to the minimum expanded eigenbox thickness $T_{min}$.

2. If $l_1^{max}-l_1^{min}$ is greater than $T_{min}-2G_{el}$, the outputs are calculated as:

$$G_{thk}=G_{el}$$

$$I_{min}=\max(0, i_{min}-G_{el})$$

$$I_{max}=\min(I-1, i_{max}+G_{el})$$

$$J_{min}=\max(0, j_{min}-G_{el})$$

$$J_{max}=\min(J-1, j_{max}+G_{el})$$

$$K_{min}=\max(0, k_{min}-G_{el})$$

$$K_{max}=\min(K-1, k_{max}+G_{el}) \quad (11)$$

3. Otherwise, the outputs are calculated as:

$$G_{thk}=(T_{min}-l_1^{max}+l_1^{min})/2$$

$$I_{min}=\max(0, i_{min}-T_{min})$$

$$I_{max}=\min(I-1, i_{max}+T_{min})$$

$$J_{min}=\max(0, j_{min}-T_{min})$$

$$J_{max}=\min(J-1, j_{max}+T_{min})$$

$$K_{min}=\max(0, k_{min}-T_{min})$$

$$K_{max}=\min(K-1, k_{max}+T_{min}) \quad (12)$$

The process of calculating electronics and sandwich parameters is performed according to the following description. This portion of the process examines the region of interest in the CT image and calculates object electronics score and sandwich density mean and standard deviation on each side of the object. Electronics score is defined as the ratio of the number of high-density voxels inside the object's expanded eigenbox divided by the number of voxels in the object.

The inputs are as follows:

| | |
|---|---|
| $C(i, j, k)$: | 3D CT image of a bag; |
| $m = (i_m, j_m, k_m)$: | object center-of-mass coordinates; |
| $\hat{e}_1$: | eigenvector along object's smallest (thickness) dimension; |
| $\hat{e}_2$: | eigenvector along object's second largest (width) dimension; |
| $\hat{e}_3$: | eigenvector along object's largest (length) dimension; |
| $l_1^{min}, l_1^{max}$: | object dimensions measured from m along $e_1$; |
| $l_2^{min}, l_2^{max}$: | object dimensions measured from m along $e_2$; |
| $l_3^{min}, l_3^{max}$: | object dimensions measured from m along $e_3$; |
| $(I, J, K)_{min}, (I, J, K)_{max}$: | coordinates of the rectangualr image slab containing the expanded object eigenbox; |
| $G_{thk}$: | actual gap around the object eigenbox in the thickness direction; and |
| N: | number of voxels in the object. |

The parameters used in calculating the electronics and sandwich parameters include:

| | |
|---|---|
| $C_{el}$: | minimum CT number of a high density voxel; |
| $G_{el}$: | gap size around the object eigenbox for electronics check; and |
| $G_{CFAR}$: | CFAR guard region size. |

The outputs of the parameter calculation include:

| | |
|---|---|
| E: | object electronics score; |
| $M_1, \sigma_1$: | density mean and standard deviation on one side of the expanded eigenbox; and |
| $M_2, \sigma_2$: | density mean and standard deviation on the other side of the expaneded eigenbox. |

In one embodiment, the process of calculating the electronics and sandwich parameters proceeds according to the following description.

1. Raster scan all of the voxels $v=(i,j,k)$ within the region of interest:

$$I_{min} \leq i \leq I_{max}$$

$$J_{min} \leq j \leq J_{max}$$

$$K_{min} \leq k \leq K_{max} \quad (13)$$

2. For each such voxel $v=(i,j,k)$ calculate its eigencoordinates $(i_e, j_e, k_e)$, i.e., the voxel coordinates in the object's coordinate system:

$$i_e = (v-m) \cdot \hat{e}_1$$

$$j_e = (v-m) \cdot \hat{e}_2$$

$$k_e = (v-m) \cdot \hat{e}_3; \quad (14)$$

where "·" indicates a scalar product.

3. Count the number $N_{el}$ of voxels v inside the expanded eigenbox that have high density. For each voxel, the eigencoordinates are checked to be within the expanded eigenbox limits and the density is compared to the minimum value given by the $C_{el}$ parameter:

$$C_{el} < C(i, j, k) \quad (15)$$

$$l_1^{min} - G_{thk} < i_e < l_1^{max} + G_{thk}$$

$$l_2^{min} - G_{el} < j_e < l_2^{max} + G_{el}$$

$$l_3^{min} - G_{el} < k_e < l_3^{max} + G_{el}$$

For each voxel that satisfies conditions (15), $N_{el}$ is incremented by one.

4. Calculate the object electronics score:

$$E = \frac{N_{el}}{N} \quad (16)$$

5. Calculate density mean M and standard deviation a for voxels $v=(i,j,k,)$ that are in the $G_{CFAR}$-thick layer outside of each of the two largest sides of the object eigenbox:

$$M_1 = \overline{C(i, j, k)} \quad (17)$$

$$\sigma_1 = \sqrt{\overline{C(i, j, k)^2} - M_1^2}$$

$$v \in \left\{ (i, j, k) \,\middle|\, \begin{array}{c} l_1^{min} - G_{CFAR} \leq i_e \leq l_1^{min} \\ l_2^{min} < j_e < l_2^{max} \\ l_3^{min} < k_e < l_3^{max} \end{array} \right\}$$

-continued $$M_2 = \overline{C(i, j, k)} \tag{18}$$

$$\sigma_2 = \sqrt{\overline{C(i, j, k)^2} - M_2^2}$$

$$v \in \left\{ (i, j, k) \middle| \begin{array}{c} I_1^{min} \leq i_e \leq I_1^{min} + G_{CFAR} \\ I_2^{min} < j_e < I_2^{max} \\ I_3^{min} < k_e < I_3^{max} \end{array} \right\}$$

In equations (17) and (18), the overbar denotes the mean of the value underneath.

The electronics score E and the means $M_1$, $M_2$ and standard deviations $\sigma_1$, $\sigma_2$, are compared to thresholds to determine if electronic concealment and/or sandwich concealment of a sheet object are present. If so, this information can be used to either selectively disable some of the discrimination features used to classify objects or to switch to an alternative set of thresholds to be used in the discrimination process. This identification process allows for increase in detection of electronically concealed sheet objects and sheets placed near or inside of uniform objects such as magazines and books.

It should be noted that in computing electronics score it is not necessary to use the object eigenbox as the region containing the object. Instead, a rectangular region defined with respect to the coordinate system of the CT scanner, i.e., having planes parallel to the orthogonal coordinate planes of the scanner, can be used.

While this invention has been particularly shown and described with references to preferred embodiments thereof, it will be understood by those skilled in the art that various changes in form and details may be made therein without departing from the spirit and scope of the invention as defined by the following claims. For example, the foregoing description describes the invention in terms of sheet-shaped objects. In particular, a preferred embodiment of the invention is described in terms of CFAR sheet detection, and the thickness of the layers analyzed to identify sandwich concealment is, in one embodiment, set to the CFAR guard size g. It will be understood that the invention is applicable to other types of objects, e.g., bulk objects, and other layer thicknesses can be selected.

What is claimed is:

1. A method of processing computed tomography (CT) data for a region comprising:
   identifying a plurality of volume elements in the CT data for the region, each volume element being associated with a density value;
   automatically identifying volume elements in the CT data associated with an object in the region;
   automatically identifying at least one subregion in proximity to the object;
   automatically calculating at least one property of the subregion; and
   processing data for the object based on the calculated property of the subregion.

2. The method of claim 1 wherein processing the object based on the calculated property of the subregion comprises altering a discrimination parameter used to classify the object as to whether it poses a threat.

3. The method of claim 2 wherein an altered discrimination parameter is a mass threshold.

4. The method of claim 1 wherein processing the object based on the calculated property of the subregion comprises classifying the object as to whether it poses a threat.

5. The method of claim 1 wherein the at least one subregion contains the object.

6. The method of claim 1 wherein the at least one subregion is a rectangular subregion containing the object.

7. The method of claim 1 wherein the at least one subregion is a rectangular subregion.

8. The method of claim 7 wherein the rectangular subregion has planar edges that are parallel to planes containing the orthogonal axes of a rectangular coordinate system of a CT scanning system used to obtain the CT data for the region.

9. The method of claim 7 wherein the rectangular subregion has planar edges that are parallel to planes containing the orthogonal axes of a rectangular coordinate system of the object.

10. The method of claim 9 wherein the rectangular coordinate system of the object is determined using a principal component analysis.

11. The method of claim 7 wherein the rectangular subregion is the smallest rectangular subregion that contains the object.

12. The method of claim 7 wherein the rectangular subregion is larger than the object.

13. The method of claim 1 wherein identifying at least one subregion comprises expanding a volume of the object.

14. The method of claim 1 wherein the object has one dimension that is substantially smaller than the other two dimensions.

15. The method of claim 14 wherein the at least one subregion is adjacent to the object along the smallest dimension of the object.

16. The method of claim 15 further comprising:
   calculating the mean of the density values of volume elements associated with the at least one subregion; and
   calculating the standard deviation of the density values of volume elements associated with the at least one subregion.

17. The method of claim 16 further comprising:
   comparing the calculated mean of the density values to a first threshold;
   comparing the calculated standard deviation of the density values to a second threshold; and
   processing data for the object based on the comparisons.

18. The method of claim 17 wherein processing data for the object comprises altering a discrimination parameter used to classify the object as to whether it poses a threat.

19. The method of claim 17 wherein the object is classified as a threat if the calculated standard deviation is below the second threshold.

20. The method of claim 19 wherein the object is classified as a threat if the calculated mean is above the first threshold.

21. The method of claim 1 further comprising counting the number of volume elements in the at least one subregion that have density values within a predetermined range of density values.

22. The method of claim 21 further comprising:
   comparing the number of volume elements in the at least one subregion that have density values within the predetermined range of density values to the number of volume elements in the object; and
   processing data for the object based on the comparison.

23. The method of claim 22 wherein the predetermined range of density values is selected based on a known density of one or more components of electronic equipment.

24. The method of claim 22 wherein processing data for the object comprises altering a discrimination parameter used to classify the object as to whether it poses a threat.

25. The method of claim 24 wherein an altered discrimination parameter is a mass threshold.

26. The method of claim 22 wherein processing data for the object comprises classifying the object as to whether it poses a threat.

27. The method of claim 21 further comprising:
comparing the number of volume elements in the at least one subregion that have density values within the predetermined range of density values to the number of volume elements in the subregion; and
processing data for the object based on the comparison.

28. The method of claim 27 wherein the predetermined range of density values is selected based on a known density of one or more components of electronic equipment.

29. The method of claim 27 wherein processing data for the object comprises altering a discrimination parameter used to classify the object as to whether it poses a threat.

30. The method of claim 29 wherein an altered discrimination parameter is a mass threshold.

31. The method of claim 27 wherein processing data for the object comprises classifying the object as to whether it poses a threat.

32. An apparatus for processing computed tomography (CT) data for a region comprising:
a receiver for receiving the CT data for the region; and
a data processor adapted to:
automatically identify a plurality of volume elements in the CT data for the region, each volume element being associated with a density value;
automatically identify volume elements in the CT data associated with an object in the region;
automatically identify at least one subregion in proximity to the object;
calculate at least one property of the subregion; and
process data for the object based on the calculated property of the subregion.

33. The apparatus of claim 32 wherein, in processing data for the object, the processor alters a discrimination parameter used to classify the object as to whether it poses a threat.

34. The apparatus of claim 32 wherein, in processing data for the object, the processor classifies the object as to whether it poses a threat.

35. The apparatus of claim 32 wherein the at least one subregion contains the object.

36. The apparatus of claim 32 wherein the at least one subregion is a rectangular subregion containing the object.

37. The apparatus of claim 32 wherein the at least one subregion is a rectangular subregion.

38. The apparatus of claim 37 wherein the rectangular subregion has planar edges that are parallel to planes containing the orthogonal axis of a rectangular coordinate system of a CT scanning system used to obtain the CT data for the region.

39. The apparatus of claim 37 wherein the rectangular subregion has planar edges that are parallel to planes containing the orthogonal axis of a rectangular coordinate system of the object.

40. The apparatus of claim 39 wherein the rectangular coordinate system of the object is determined using a principle component analysis.

41. The apparatus of claim 37 wherein the rectangular subregion is the smallest rectangular subregion that contains the object.

42. The apparatus of claim 37 wherein the rectangular subregion is larger than the object.

43. The apparatus of claim 32 wherein the at least one subregion is identified by expanding a volume of the object.

44. The apparatus of claim 32 wherein the object has one dimension that is substantially smaller than the other two dimensions.

45. The apparatus of claim 44 wherein the at least one subregion is adjacent to the object along the smallest dimension of the object.

46. The apparatus of claim 45 wherein the data processor (i) calculates the mean of the density values of volume elements associated with the at least one subregion, and (ii) calculates the standard deviation of the density values of volume elements associated with the at least one subregion.

47. The apparatus of claim 46 wherein the data processor (i) compares the calculated mean of the density values to a first threshold, (ii) compares the calculated standard deviation of the density values to a second threshold, and (iii) processes data for the object based on the caparisons.

48. The apparatus of claim 47 wherein the data processor classifies the object as a threat if the calculated standard deviation is below the second threshold.

49. The apparatus of claim 48 wherein the data processor classifies the object as a threat if the calculated mean is above the first threshold.

50. The apparatus of claim 32 wherein the data processor counts the number of volume elements in the at least one subregion that have density values within a predetermined range of density values.

51. The apparatus of claim 50 wherein the data processor (i) compares the number of volume elements in the at least one subregion that have the density values within a predetermined range of density values to the number of volume elements in the object, and (ii) processes data for the object based on the comparison.

52. The apparatus of claim 51 wherein the predetermined range of density values is selected based on a known density of one or more components of electronic equipment.

53. The apparatus of claim 50 wherein the data processor (i) compares the number of volume elements in the at least one subregion that have the density values within a predetermined range of density values to the number of volume elements in the subregion and (ii) processes data for the object based on the comparison.

54. The apparatus of claim 53 wherein the predetermined range of density values is selected based on a known density of one or more components of electronic equipment.

* * * * *